US012368284B2

(12) United States Patent
Dial

(10) Patent No.: US 12,368,284 B2
(45) Date of Patent: Jul. 22, 2025

(54) ROTARY SPARK GAP HAVING A PLURALITY OF ROTORS

(71) Applicant: DCD TECHNOLOGIES LLC, Ocean Springs, MS (US)

(72) Inventor: Daniel Christopher Dial, Shelton, WA (US)

( * ) Notice: Subject to any disclaimer, the term of this patent is extended or adjusted under 35 U.S.C. 154(b) by 99 days.

(21) Appl. No.: 18/403,532

(22) Filed: Jan. 3, 2024

(65) Prior Publication Data

US 2025/0219359 A1 Jul. 3, 2025

(51) Int. Cl.
*H01T 7/00* (2006.01)
*H01T 1/14* (2006.01)

(52) U.S. Cl.
CPC ................. *H01T 7/00* (2013.01); *H01T 1/14* (2013.01)

(58) Field of Classification Search
CPC ............... H01J 21/20; H01T 7/00; H01T 1/14
See application file for complete search history.

(56) References Cited

U.S. PATENT DOCUMENTS 775,872 A * 5/1904 Strong .................... H01J 21/20

* cited by examiner

*Primary Examiner* — Joseph L Williams
(74) *Attorney, Agent, or Firm* — CHRISTOPHER C. DREMANN, P.C.; Christopher C. Dremann

(57) ABSTRACT

A rotary spark gap that operates as a high-speed, high-voltage switch includes a rotor assembly having a plurality of rotors and a plurality of insulating spacers mounted on a rotatable rotor shaft with the rotors spaced and separated by the insulating spacers in an axial direction. Each rotor has a plurality of rotor points on the periphery and spaced apart around the outer circumference of the rotor. The rotor points electrically couple with a pair of bar electrodes disposed on opposite sides of the rotors. Each bar electrode is in heat conducting relation with a thermally-conductive heat to dissipate heat from the plasma generated by the arcing between the rotor points and the bar electrode. The rotary spark gap is configured for use with a Tesla coil in a Pulsed Electromechanical Field (PEMF) therapy system or device.

20 Claims, 8 Drawing Sheets

ROTARY SPARK GAP HAVING A PLURALITY OF ROTORS

FIELD OF THE INVENTION

The present invention relates generally to high-speed, high-voltage switching systems and devices. More particularly, the invention is a rotary spark gap having a plurality of rotors. In an exemplary embodiment, the rotary spark gap system has two or more rotors each having a plurality of rotor points that are spaced apart in an axial direction and displaced in a circumferential direction relative to one another.

BACKGROUND OF THE INVENTION

Rotary spark gaps are known for use in high-speed, high-voltage switching systems and devices. By way of an example, a transmitter having a capacitor charged with alternating current (AC) from a high-voltage transformer may be equipped with a rotary spark gap for discharging the capacitor. The rotary spark gap may consist of a number of electrodes spaced circumferentially around a wheel that is spun (rotated) by an electric motor. The electrodes on the wheel produce sparks as they are rotated past a stationary electrode.

A Tesla coil is a particular high-speed, high-voltage device that utilizes a spark gap. The spark gap device functions as the high-speed switch that turns the high-voltage of the primary coil on and off rapidly, for example up to five thousand (5000) times per second, to produce the resonance in the secondary coil (i.e., output coil). The plasma produced by the arcing which occurs between the rotor and the electrode generates a considerable amount of heat that rapidly erodes the face of the electrode. Erosion of the electrode face is the foremost cause of failure for a Tesla coil having any significant power. Consequently, Tesla coils equipped with conventional spark gaps have a very short operating cycle and limited life span. Generally, it is only about five (5) to fifteen (15) minutes of operating before spark gap failure occurs due to overheating. The short time before spark gap failure limits the length of the operating cycle, requires frequent maintenance, and results in a shorted life span of the Tesla coil.

Certain applications using a Tesla coil require substantially longer operating cycles. A particular such application is a resonator system for a Pulsed Electromagnetic Field (PEMF) therapy device that utilizes a Tesla coil to produce resonance. Effective PEMF therapy devices need to be able to operate for extended periods, up to several hours non-stop, without overheating and/or experiencing spark gap failure that requires frequent maintenance or results in a shortened life span.

In view of the foregoing, it is apparent a need exists for an improved high-speed, high-voltage switching system or device. A more particular need exists for an improved spark gap system or device that operates as a high-speed, high-voltage switch, for example, in a Tesla coil. A further particular need exists for a spark gap system or device that overcomes the problems and deficiencies associated with conventional spark gaps. A further particular need exists for a rotary spark gap that has a longer operating cycle without overheating and/or experiencing spark gap failure that requires frequent maintenance or results in a shortened life span. A further need exists for an improved spark gap having a reduced operating temperature that increases the operating cycle time, durability and life span of the spark gap.

SUMMARY OF THE INVENTION

In one aspect, the present invention is embodied by an improved rotary spark gap that operates as a high-speed, high-voltage switch. The rotary spark gap includes a rotor assembly having at least one rotor with a plurality of rotor points disposed on the rotor, and at least one rotatable rotor shaft configured and operable for rotating the rotor. The rotor assembly further includes at least one electrode disposed within the housing and operable for electrically coupling with the rotor points on the rotor. The rotor assembly further includes at least one heat sink in heat-conducting relation with the at least one electrode configured and operable for conducting heat away from the rotor assembly.

In an embodiment of the rotary spark gap, the rotor assembly includes a plurality of rotors each having a plurality of rotor points disposed on the rotor. In a particular example of the embodiment, each rotor is a generally annular rotor disk and the plurality of rotor points are disposed on the periphery of the rotor disk and spaced apart around the outer circumference of the rotor disk. The plurality of rotors is spaced apart in an axial direction by insulating spacers made of an insulating material.

In another embodiment of the rotary spark gap, the rotor assembly includes a plurality of electrodes disposed on opposite sides of the rotors. In a particular example of the embodiment, the electrodes are bar electrodes that span the rotors and the insulating spacers in the axial direction.

In another embodiment of the rotary spark gap, each rotor is made of an electrically-conductive material and each electrode is made of an electrically-conductive material. In a particular example of the embodiment, each rotor is made of a copper (Cu) metal material and each electrode is made of a copper (Cu) metal material.

In another embodiment of the rotary spark gap, the rotor shaft is rotated by a belt drive and extends in the axial direction through each rotor and each insulating spacer. In a particular example of the embodiment, the rotor shaft is mounted on high-speed bearings and the belt drive is operatively connected to a rotor shaft drive motor. The rotor shaft drive motor may be an electric motor and may be disposed adjacent to the exterior of the rotary spark gap.

In another embodiment of the rotary spark gap, each heat sink is made of an aluminum (Al) metal material.

In another embodiment of the rotary spark gap, each electrode is slotted to permit adjustment of the position of the electrode as the electrode wears.

In another aspect, the present invention is embodied by a rotary spark gap for a Tesla coil. The rotary spark gap includes a housing defining an interior compartment configured to contain a rotor assembly. The rotor assembly includes a plurality of electrically-conductive annular rotor disks each having a plurality of rotor points disposed on the periphery of the rotor disk and spaced apart around the outer circumference of the rotor disk in a radial direction. The rotor disks are mounted on a rotatable rotor shaft in an axial direction and spaced apart by insulating spacers. The rotor assembly further includes a plurality of electrically-conductive bar electrodes disposed within the housing on opposite sides of the rotor disks and spacers and operable for electrically coupling with the rotor points. In a particular example of the embodiment, the rotor assembly includes four (4) rotor disks each having a total of nine (9) rotor points equally spaced, i.e., forty degrees (40°), around the outer circumference of the rotor disk, and two (2) bar electrodes. The rotor assembly further includes a heat sink made of a thermally-conductive material in heat-conducting relation with each bar electrode. The rotor assembly further includes a rotor shaft drive motor operable for rotating the rotor shaft with the rotor disks and insulating spacers mounted on the rotor shaft.

In another embodiment, each rotor disk is made of a copper (Cu) metal material and each bar electrode is made of a copper (Cu) metal material.

In another embodiment, each heat sink is made of an aluminum (Al) metal material.

In another embodiment, each bar electrode is slotted to permit adjustment of the position of the electrode as the electrode wears due to plasma arcing.

In another embodiment, the rotor shaft is a belt-driven rotor shaft that is mounted on high-speed bearings and operatively connected to a rotor shaft drive motor.

In another embodiment, the housing is made of an insulating material and includes a cover for enclosing the rotor assembly within the housing. In a particular example of the embodiment, the housing is an insulated, generally hollow, box-like container that defines the interior compartment configured to contain the rotor assembly.

Additional aspects, objects, features and advantages of the present invention will be made apparent or will be readily understood and appreciated by those skilled in the relevant art, as exemplary embodiments of the invention shown in the accompanying drawing figures are described in greater detail hereinafter. It is intended that all such aspects, objects, features and advantages of the invention envisioned by this disclosure of embodiments be encompassed by the appended claims given their broadest reasonable interpretation consistent with this disclosure from the viewpoint of one of ordinary skill in the art. Consequently, the various terms used in this disclosure should be construed according to their ordinary and customary meaning as understood by one of ordinary skill in the art at the time of the invention. The aspects, objects, features and advantages of the invention, as well as others not expressly disclosed, may be accomplished by one or more of the embodiments described herein and shown in the accompanying drawing figures, as well as others that are not expressly described and shown herein. However, it should be appreciated that the various embodiments and drawing figures provided herein are merely illustrative of the invention and its various forms, and that many modifications, changes, revisions and substitutions may be made to any of the embodiments without departing from the general concepts of the invention.

BRIEF DESCRIPTION OF THE DRAWING FIGURES

The aforementioned aspects, objects, features and advantages of the present invention, as well as the embodiments of the invention provided herein, will be more fully understood and appreciated when considered in conjunction with the accompanying drawing figures, in which like reference characters designate the same or similar parts throughout the several views.

DESCRIPTION OF EXEMPLARY EMBODIMENTS OF THE INVENTION

The following is a description of exemplary embodiments of a rotary spark gap configured for use with high-speed, high-voltage switching systems and devices. In a particular application, the invention is an improved rotary spark gap for a Tesla coil that operates as the switch that turns the high voltage of the primary coil on and off at high speed (e.g., 5000 times per second) to achieve resonance in the secondary coil (output coil). The improved rotary spark gap reduces the heat produced by the plasma generated from the arcing between the rotor and the electrode that erodes the face of the electrode and consequently limits the operating cycles and life span of the spark gap. In addition to reducing the operating temperature to increase operating cycle time and durability, the improved rotary spark gap reduces the maintenance required and the noise produced by the rotary spark gap. As a result, the improved rotary spark gap is particularly well-suited for use with a Tesla coil in a Pulsed Electromagnetic Field (PEMF) therapy system or device.

Exemplary embodiments of the present invention are described more fully hereinafter with reference to the accompanying drawing figures. These exemplary embodiments show and describe an improved rotary spark gap system and device with reduced operating temperature that increases operating cycle time and life span, while reducing required maintenance and noise produced by the rotary spark gap. A particular embodiment of the rotary spark gap is configured for use as the high-speed, high-voltage switch for the primary coil of a Tesla coil suited for use in PEMF therapy system or device. However, it is not intended for the invention to be limited in any manner by the exemplary embodiments shown and described herein. Instead, it is expected the present invention will be given the broadest reasonable interpretation and construction consistent with this disclosure. Furthermore, unless a specific interpretation, definition or construction is expressly provided, the exemplary embodiments illustrated herein, and the various terms used herein should be given their ordinary and customary meanings as would be understood by a person of ordinary skill in the art at the time of the invention.

Figure 1:
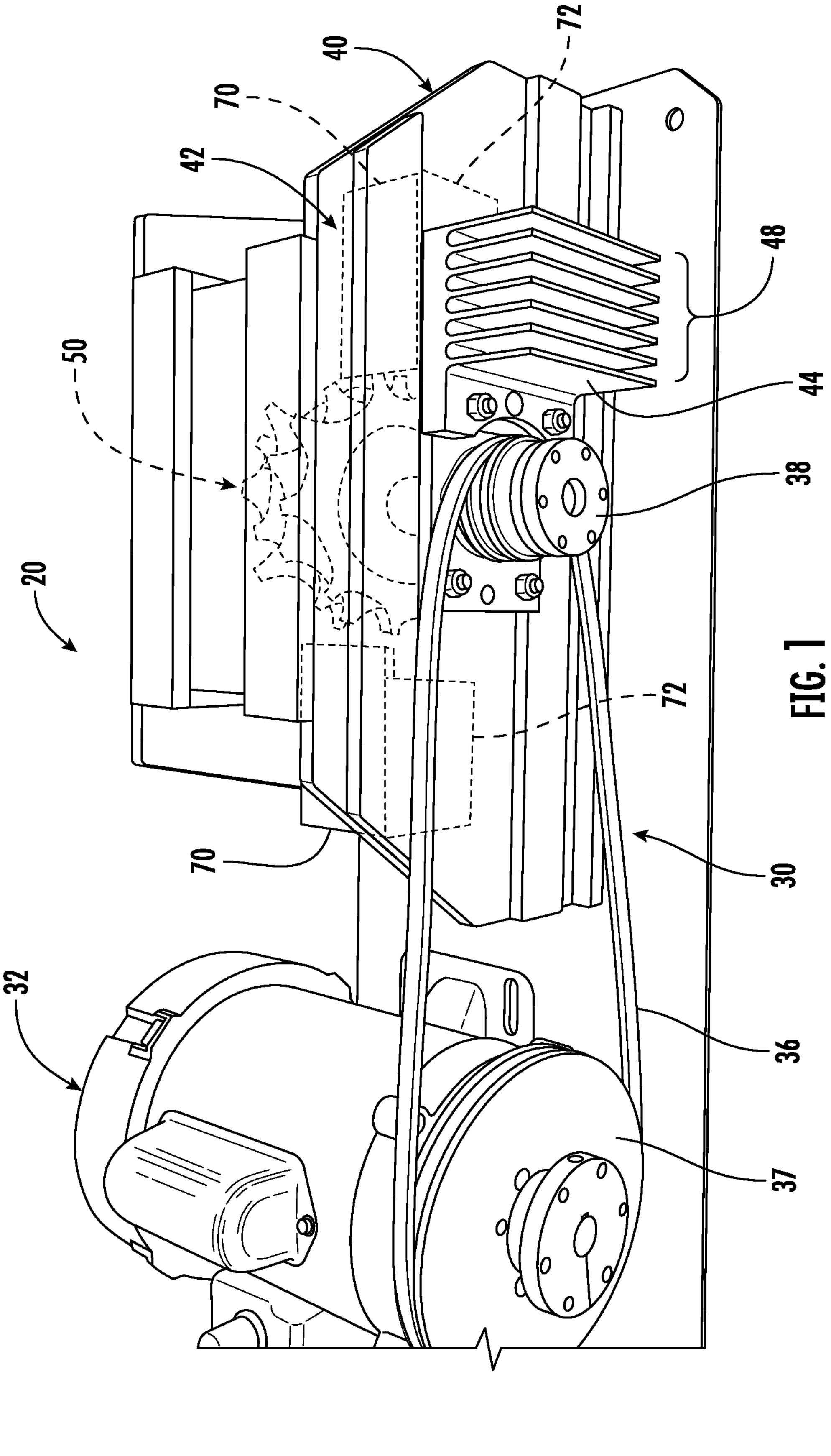
FIG. 1 is a perspective view of a rotary spark gap according to an aspect of the present invention, taken from a side of the rotary spark gap.
Figure 2:
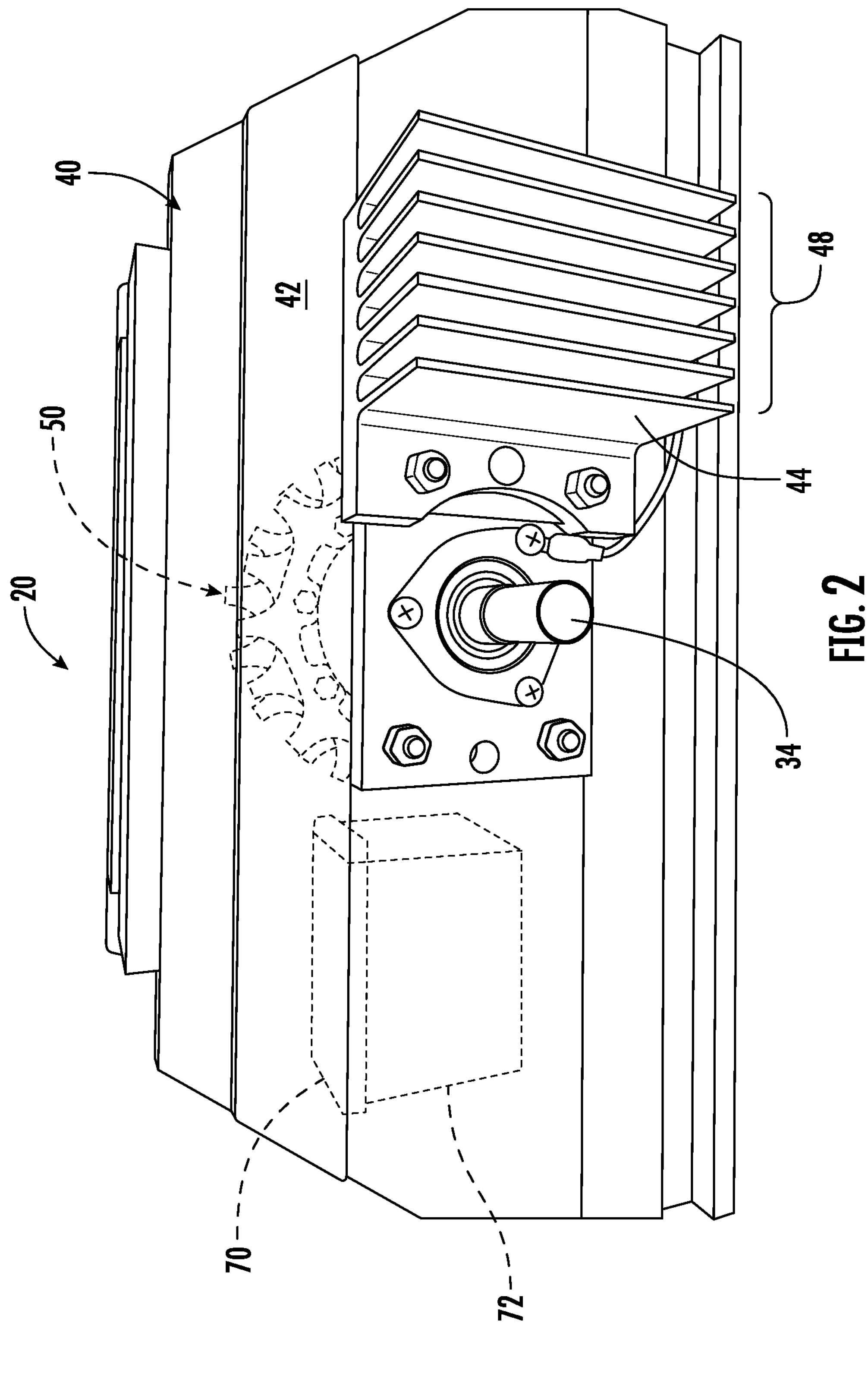
FIG. 2 is a perspective view of the rotary spark gap of FIG. 1 with the belt drive and drive motor for the rotor shaft removed for purposes of clarity.
Figure 3:
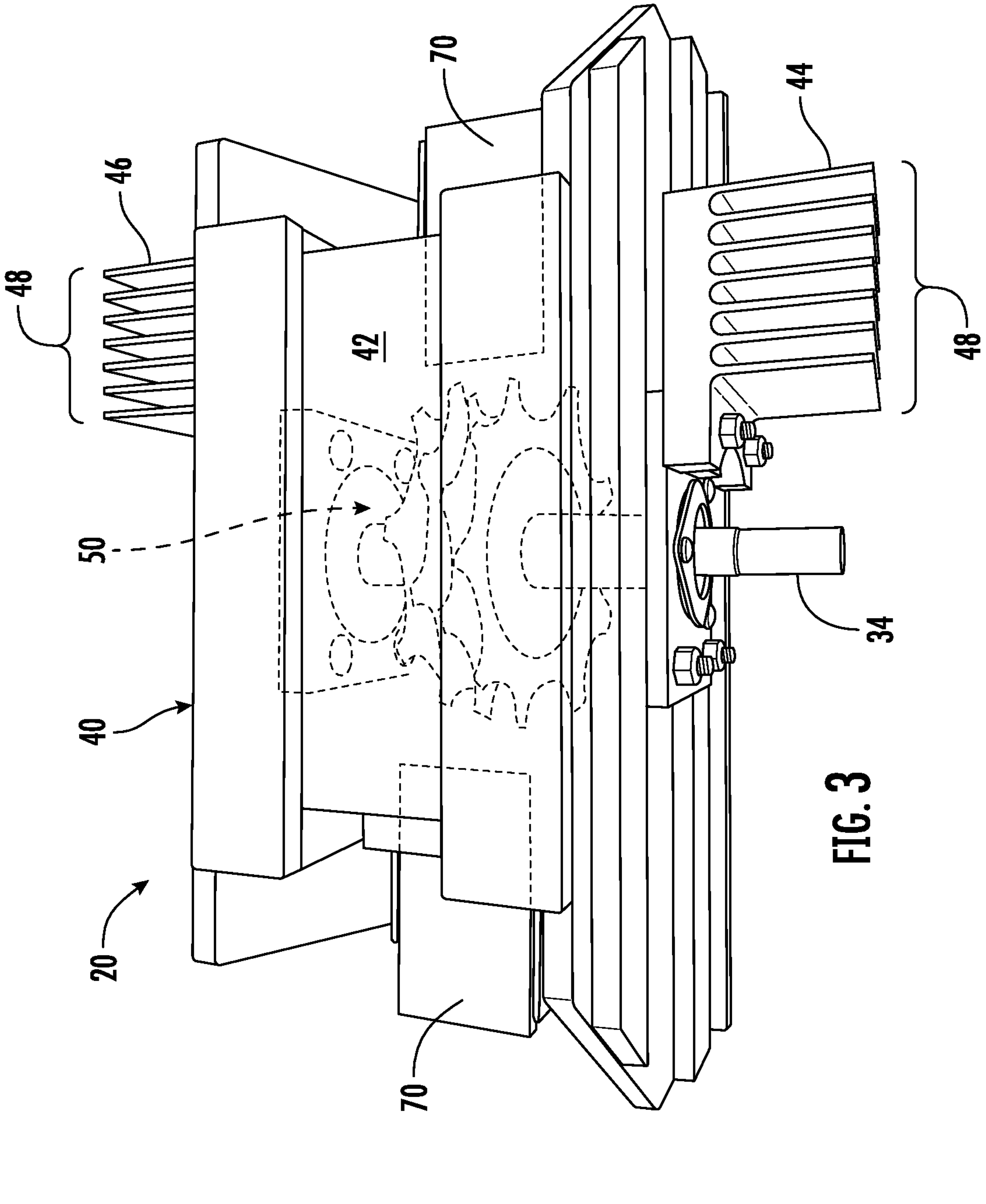
FIG. 3 is a perspective view of the rotary spark gap of FIG. 1, taken from above the rotary spark gap.
Figure 4:
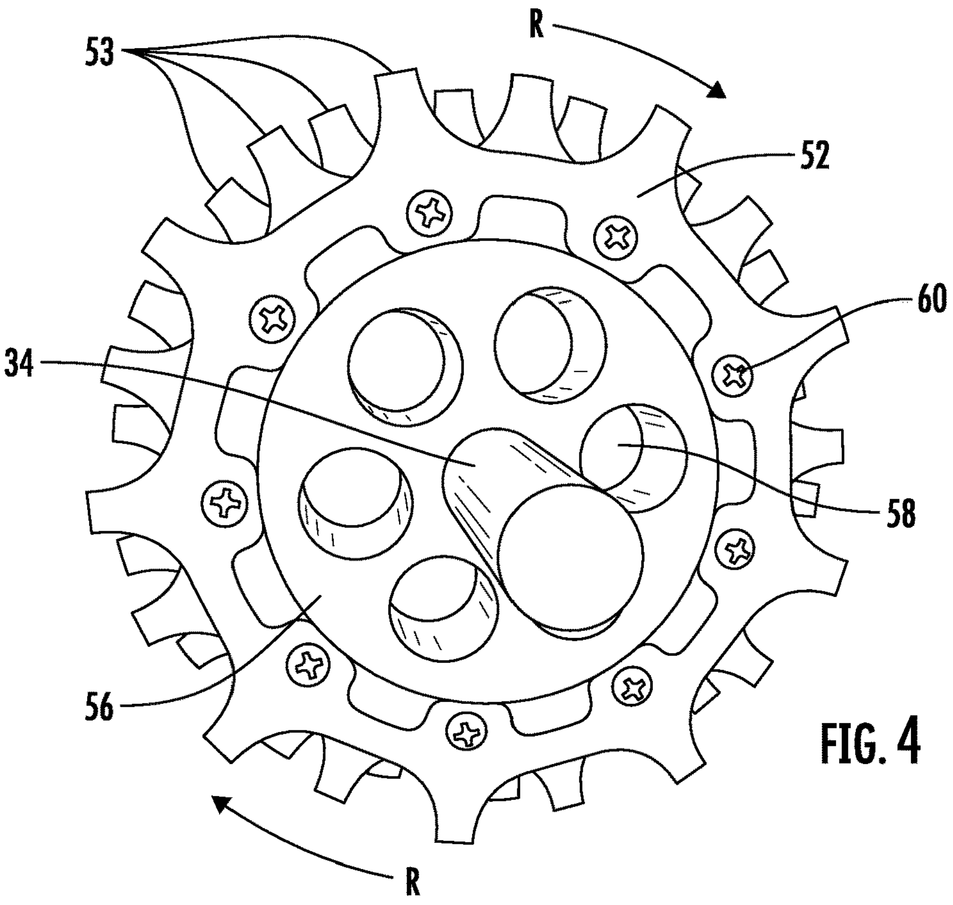
FIG. 4 is a perspective view showing the rotor shaft with a plurality of the rotors and the insulating spacers mounted on the rotor shaft.
Figure 5:
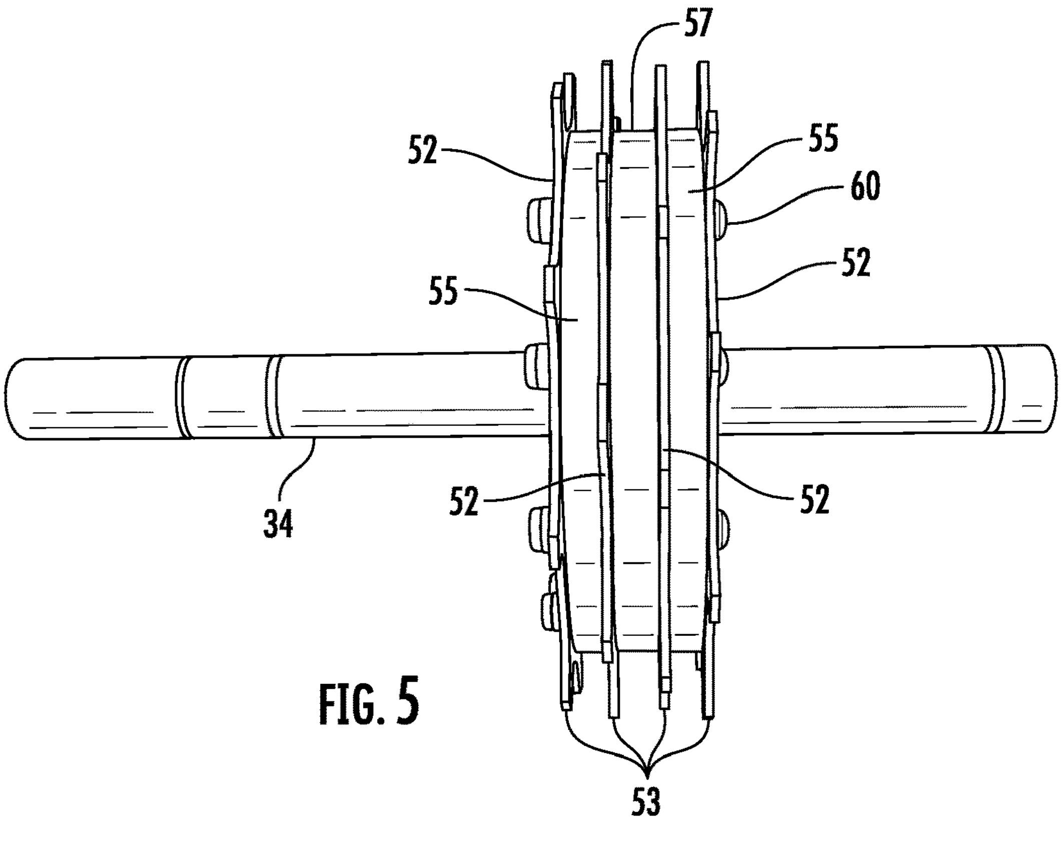
FIG. 5 is an elevation view showing the rotor shaft with a plurality of the rotors and the insulating spacers mounted on the rotor shaft.
Figure 6:
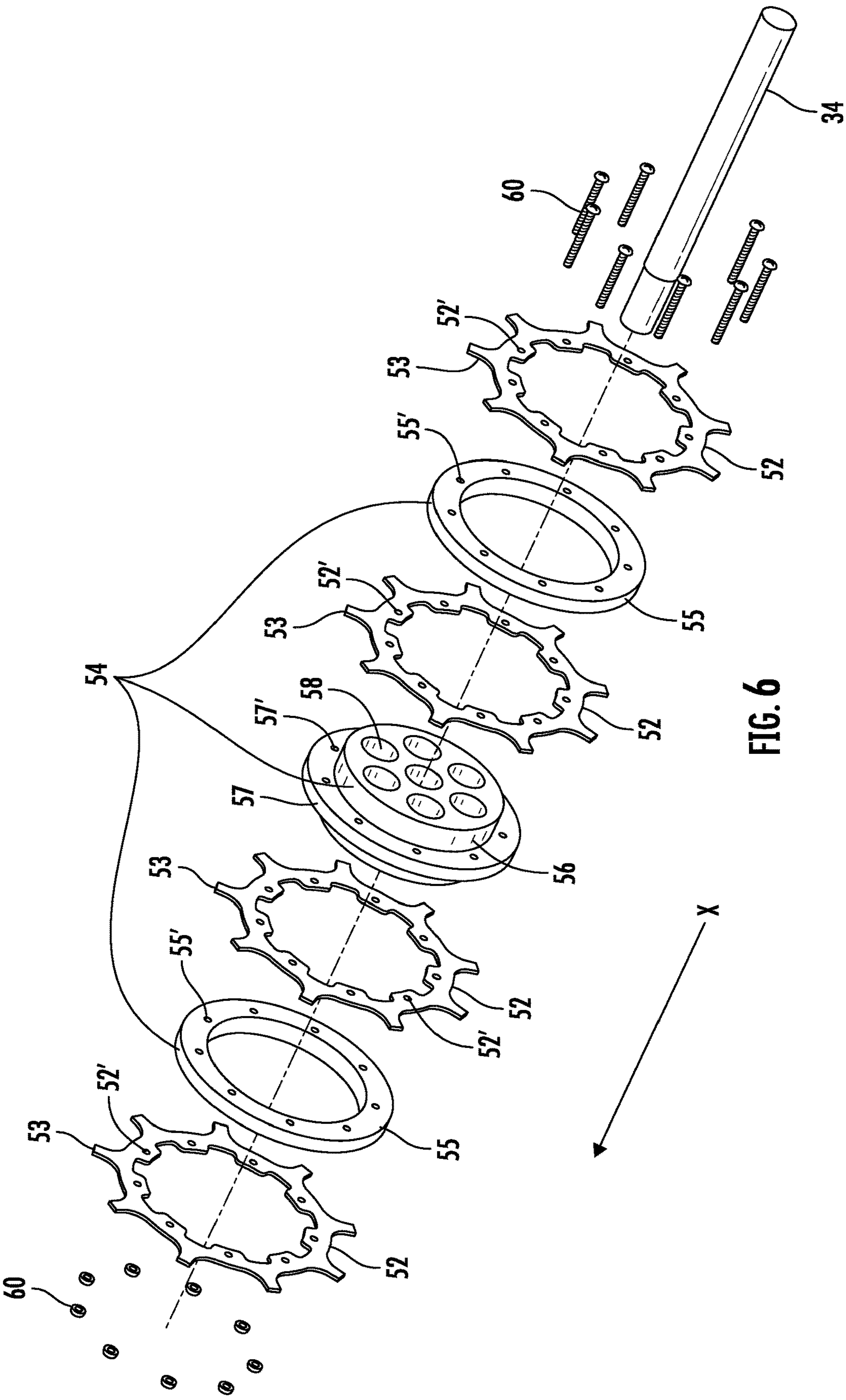
FIG. 6 is an exploded perspective view showing the assembly of the rotor shaft with the plurality of the rotors and the insulating spacers.

In one aspect, the present invention is embodied by an improved rotary spark gap, indicated generally herein by reference character 20. FIGS. 1-3 show various views of the improved rotary spark gap 20 system or device. FIGS. 4-6 show components of the rotary spark gap 20 in greater detail.

FIG. 1 is a perspective view taken from a side of the rotary spark gap 20. The rotary spark gap 20 includes a rotor shaft 34 (FIGS. 2-6) that may, by way of example and not limitation, be belt-driven by a belt drive 30 with a drive motor 32. The belt drive 30 may consist of a belt 36 operatively coupled between a drive motor pulley 37 affixed to the drive motor 32 and a rotor shaft pulley 38 affixed to the rotor shaft 34. The drive motor 32 may be any suitable type of motor for driving belt 36 to rotate the rotor shaft 34, but for purposes of convenience is shown herein as electric drive motor 32. The rotor shaft 34 may be mounted on suitable high-speed bearings that permit the rotor shaft 34 to be cycled continuously for up to twenty-four (24) hours without failure and operated for up to fifteen hundred (1500) hours without adjustment.

FIG. 2 is a perspective view of the rotary spark gap 20 with the belt drive 30 and the drive motor 32 for the rotor shaft 34 removed for purposes of clarity. The rotor shaft 34 is rotatably mounted on a housing 40 of the rotary spark gap 20. Housing 40 may be made of any material suitable for containing the internal components of the rotary spark gap 20 and withstanding the high-speed, high-voltage operation of the rotary spark gap 20. In particular, the material of the housing 40 must be capable of withstanding the heat produced by the plasma generated from the rotary spark gap 20. Regardless, the housing 40 defines an interior compartment 42 configured (sized and shaped) for containing the internal components of the rotary spark gap 20, as will be described herein after with reference to FIGS. 4-6.

FIG. 3 is a perspective view taken from above the rotary spark gap 20. As best shown in FIG. 3, a heat sink 44, 46 is affixed to the exterior of the housing 40 on each side of the rotary spark gap 20. The heat sink 44, 46 is in heat-conducting relation with the rotor shaft 34. More particularly, a heat sink 44, 46 on the exterior of the housing 40 is in heat-conducting relation with the rotor shaft 34 at each of the opposed ends of the rotor shaft 34 to conduct heat from the rotor shaft 34 to the ambient environment. The heat sink 44, 46 may be made of any suitable thermally-conductive material, such as aluminum (Al) metal material. As shown herein, the heat sink 44, 46 is formed with one or more slots that define heat-radiating fins 48 for radiating heat into the ambient environment in a conventional manner.

Referring now to FIGS. 4-6, the rotary spark gap 20 includes a rotor assembly 50 that is primarily disposed within the interior compartment 42 defined by the housing 40. Rotor assembly 50 include the rotor shaft 34, at least one rotor 52 and at least one insulating spacer 54 for isolating the rotor(s) 52 from the rotor shaft 34. Rotor shaft 34 may be made of any material suitable for withstanding the heat produced by the plasma generated from the rotary spark gap 20. By way of example and not limitation, the rotor shaft 34 may be made of a heat conductive, high-temperature resistant metal material, such as carbon steel or stainless steel. The rotor 52 may be made of any electrically conductive material suitable for use in the high-speed, high-voltage switch of the rotary spark gap 20. It has been found desirable to achieve the desired benefits of the present invention for the rotor(s) 52 to be made of a copper (Cu) metal material. The insulating spacer(s) 54 may be made of any thermally-insulating material suitable for withstanding the heat produced by the plasma generated from the rotary spark gap 20 and electrically isolating the rotor(s) 52 from the rotor shaft 34. By way o example and not limitation, the insulating spacer(s) 54 may be made of a high-temperature resistant polymer material, such as polyetherimide (PEI), polytetrafluorethylene (PTFE), polybenzimidazole (PBI), or the like.

In an embodiment, The rotor assembly 50 includes the rotor shaft 34 with a plurality of rotors 52 and a plurality of insulating spacers 54 mounted on the rotor shaft 34. In the exemplary embodiment shown in FIGS. 4-6, the rotor assembly 50 includes four (4) rotors 52 and three (3) insulating spacers 54 mounted on the rotor shaft 34. The rotors 52 are spaced apart on the rotor shaft 34 in an axial direction X by the insulating spacers 54. As such, the rotors 52 are separated from one another by a relatively short distance, for example from about one-quarter inch (¼") to about one inch (1"). As shown herein, the insulating spacers 54 consist of a pair of annular outer spacers 55 disposed on opposite sides of a center spacer 56 when the insulating spacers 54 are mounted on the rotor shaft 34. The center spacer 56 has a medial flange 57 that extends radially outwardly from the remainder of the center spacer 56. The flange 57 is provided with a plurality of holes 57' formed through the flange 57 in the axial direction X. Center spacer 56 further has a plurality of openings 58 formed therethrough in the axial direction X with a center one of the openings 58 configured to receive the rotor shaft 34.

Two rotors 52 spaced apart in the axial direction X and separated by an outer spacer 55 are disposed on each side of the center spacer 56. The rotors 52 and the outer spacers 55 are each provided with a plurality of holes 52', 55', respectively, that correspond to the holes 57' formed through the flange 57. A plurality of fasteners 60, such as conventional threaded machine screws and nuts, secure the rotors 52 and outer spacers 55 together on the flange 57 of the center spacer 56 with the rotors 52 spaced apart in the axial direction X and separated by the outer spacers 55 and the flange 57 of the center spacer 56. The center spacer 56 with the rotors 52 and the outer spacers 55 secured thereon is mounted on and securely affixed to rotor shaft 34 at a predetermined location in the axial direction X. As best shown in FIG. 5, the rotor shaft 34 may be provided with grooves, undercuts or similar structural features for rotatably mounting the rotor shaft 34 within the housing 40 and/or to the belt drive 30.

In an embodiment, each rotor 52 has a plurality of rotor points 53 disposed on the periphery of the rotor 52 and spaced apart around the outer circumference of the rotor 52 in a radial direction R. In the exemplary embodiment shown herein, each rotor 52 has a total of nine (9) rotor points 53 that are spaced apart around the outer circumference of the rotor 52 by about forty degrees (40°) in the radial direction R. The four (4) rotors 52 are mounted on the rotor shaft 34 with the rotors 52 out of phase with one another by about ten degrees (10°). As a result, the four (4) rotors 52 having nine (9) rotor points 53 each stacked together with the insulating spacers 54 appear as a thirty-six (36) point wheel when viewed from an end in the axial direction X, as illustrated by FIG. 4.

The thirty-six (36) rotor points 53 electrically couple with electrodes of the rotary spark gap 20, as will be described hereinafter. Dividing the number of breaks and makes per rotor by the four (4) rotors 52 reduces the build-up of heat produced by the plasma generated by the rotary spark gap 20 since the number of operating cycles per rotation of the rotor assembly 50 is reduced from thirty-six (36) down to nine (9).

Consequently, the number of electrodes can be reduced from eight (8) on a single rotor 52 having nine (9) rotor points 53 to two (2) electrodes that span the four (4) rotors 52.

The rotary spark gap 20 of this embodiment includes two (2) electrodes 70 schematically illustrated by broken lines in FIG. 2 and by partial solid and partial broken lines in FIG. 1 and FIG. 3. As shown herein, each electrode 70 is configured in the form of a bar electrode that spans the four (4) rotors 52 in the axial direction X. Each bar electrode 70 is disposed within the interior compartment 42 defined by the housing 40 in heat-conducting relation with a heat sink 72 for conducting heat from the bar electrode 70 to the ambient environment in a conventional manner. Heat sink 72 is made of a suitable heat conductive material, such as aluminum (Al) metal material. Bar electrode 70 is made of an electrically conductive material suitable for electrically coupling with the rotor points 53 on the rotors 52. For purposes of the present invention, the bar electrodes 70 may be made of a copper (Cu) metal material. If desired, the bar electrode 70 may be slotted to permit adjustment as the electrode wears. The bar electrodes 70 are the sacrificial consumable portion of the rotary spark gap 20 and are disposed within the housing 40 in a convenient and readily replaceable manner. The rotor points 53 of the rotors 52 erode much more slowly, but nevertheless, are likewise disposed within the housing 40 in a convenient and readily replaceable manner.

In another aspect, the present invention is embodied by an improved rotary spark gap, indicated generally herein by reference character 120, configured for use with a Tesla coil, indicated generally herein by reference character 100. The rotary spark gap 120 operates as the high-speed, high-voltage switch for the primary coil of the Tesla coil 100 to achieve resonance in the secondary coil (output coil). In the exemplary embodiment shown in FIGS. 7-10 and described hereinafter, the rotary spark gap 120 is configured for use with a Tesla coil 100 in a PEMF therapy system or device. The rotary spark gap 120 is the same in configuration, construction and operation as the rotary spark gap 20 shown and described herein with reference to FIGS. 1-6 except as expressly noted.

Figure 7:
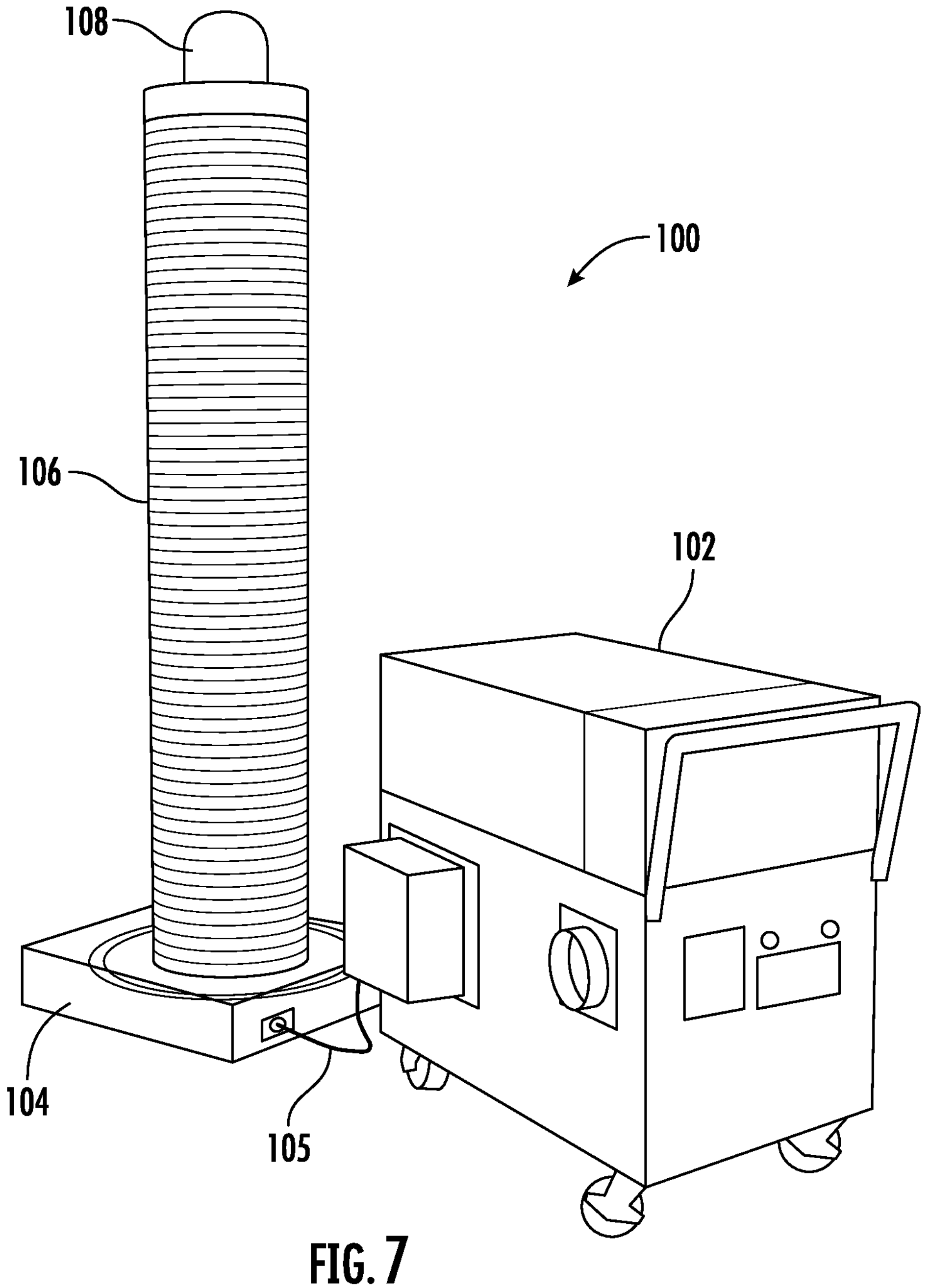
FIG. 7 is an environmental perspective view of a rotary spark gap for a Tesla coil according to another aspect of the present invention.

FIG. 7 is an environmental perspective view showing the rotary spark gap 120 configured for use with the Tesla coil 100. In general, the Tesla coil 100 consists of a power box 102, a primary coil 104, a secondary coil 106 and a bulb assembly 108. The power box 102 contains a high-voltage source, such as a conventional neon sign transformer with a rating of fifteen thousand (15,000) volts at thirty (30) milliamperes a capacitor and the rotary spark gap 120. The capacitor and the high-voltage source together are commonly referred to as the resonator. The capacitor and the rotary spark gap 120 are each in electrical communication with the high-voltage source, and the high-voltage source in turn is in electrical communication with the primary coil 104 through an electrical interconnection cable 105. The rotary spark gap 120 operates as the high-speed switch that turns the high-voltage generated by the high-voltage source and provided to the primary coil 104 on and off rapidly. In the present example, the high-speed rotary spark gap 120 switches the high-voltage of the primary coil 104 on and off about five thousand (5000) times per second, such that the Tesla coil 100 operates at a frequency of up to 5000 Hz.

A standard Tesla coil is an electrical resonant transformer circuit for producing high-voltage, low-current, high-frequency alternating current electrical energy. Standard Tesla coils can be operated for only short periods of time, and consequently, for only a short number of operating cycles, before overheating due to the heat produced from the plasma generated by the arcing between the rotor of the spark gap and the electrode. In addition, the considerable amount of heat erodes the face of the electrode, which causes premature failure and results in a short life span of a standard Tesla coil without frequent maintenance, repair and/or replacement.

The Tesla coil 100 configured with the rotary spark gap 120 of the present invention overcomes the problems and deficiencies of standard Tesla coils by reducing the operating temperature of the rotary spark gap 120. The reduced operating temperature of the rotary spark gap 120 increases the operating cycle time, durability and life span of the Tesla coil 100 with less frequent required maintenance, repair and/or replacement of the rotor or the electrode, while reducing the noise produced during operation of the Tesla coil 100. In general, the reduced operating temperature and increased operating cycle time durability and life span of the Tesla coil 100 is achieved by the pair of fixed bar electrodes 170 that align periodically (i.e., electrically couple) with the plurality of flying electrodes (i.e., the rotor points 153) on rotors 152 rotated at a constant angular velocity and generate high-frequency radio waves suitable for PEMF therapy. The rotary spark gap 120 can generate the high-frequency radio waves at about 5000 Hz with a rotor shaft speed of only about eighty-four hundred (8400) revolutions per minute (RPM) rather than the ten thousand (10,000) revolutions per minute (RPM) of a standard Tesla coil.

Figure 8:
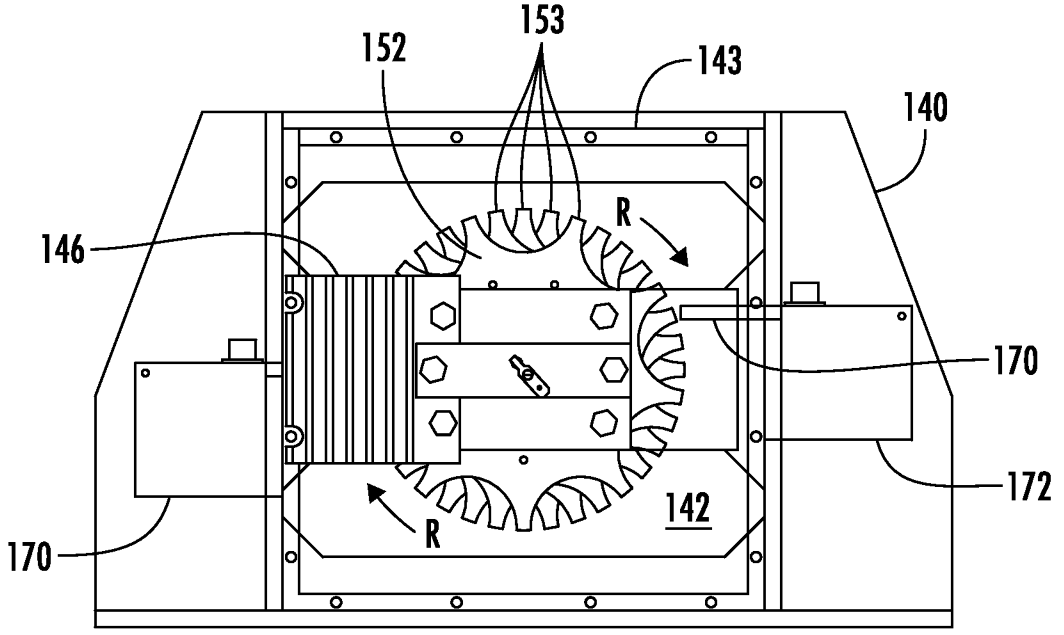
FIG. 8 is an elevation view of the rotary spark gap of FIG. 7, taken from a side of the rotary spark gap with portions of the housing removed for purposes of clarity.
Figure 9:
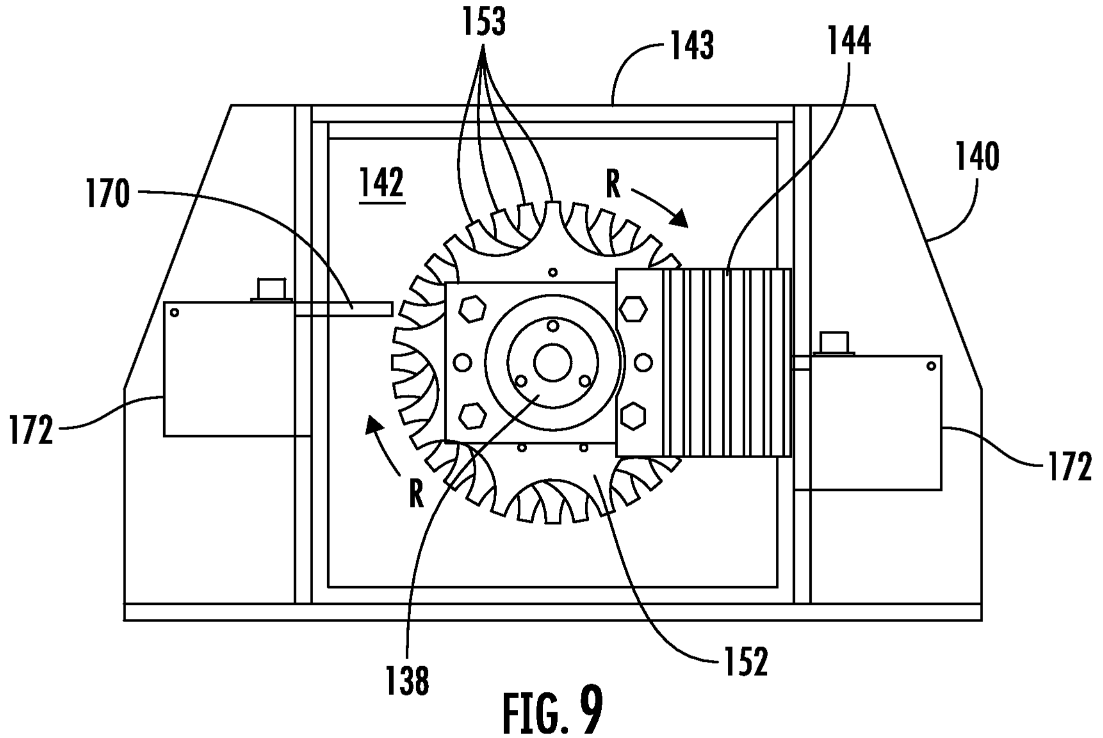
FIG. 9 is an elevation view of the rotary spark gap of FIG. 7, taken from the opposite side of the rotary spark gap with portions of the housing removed for purposes of clarity.
Figure 10:
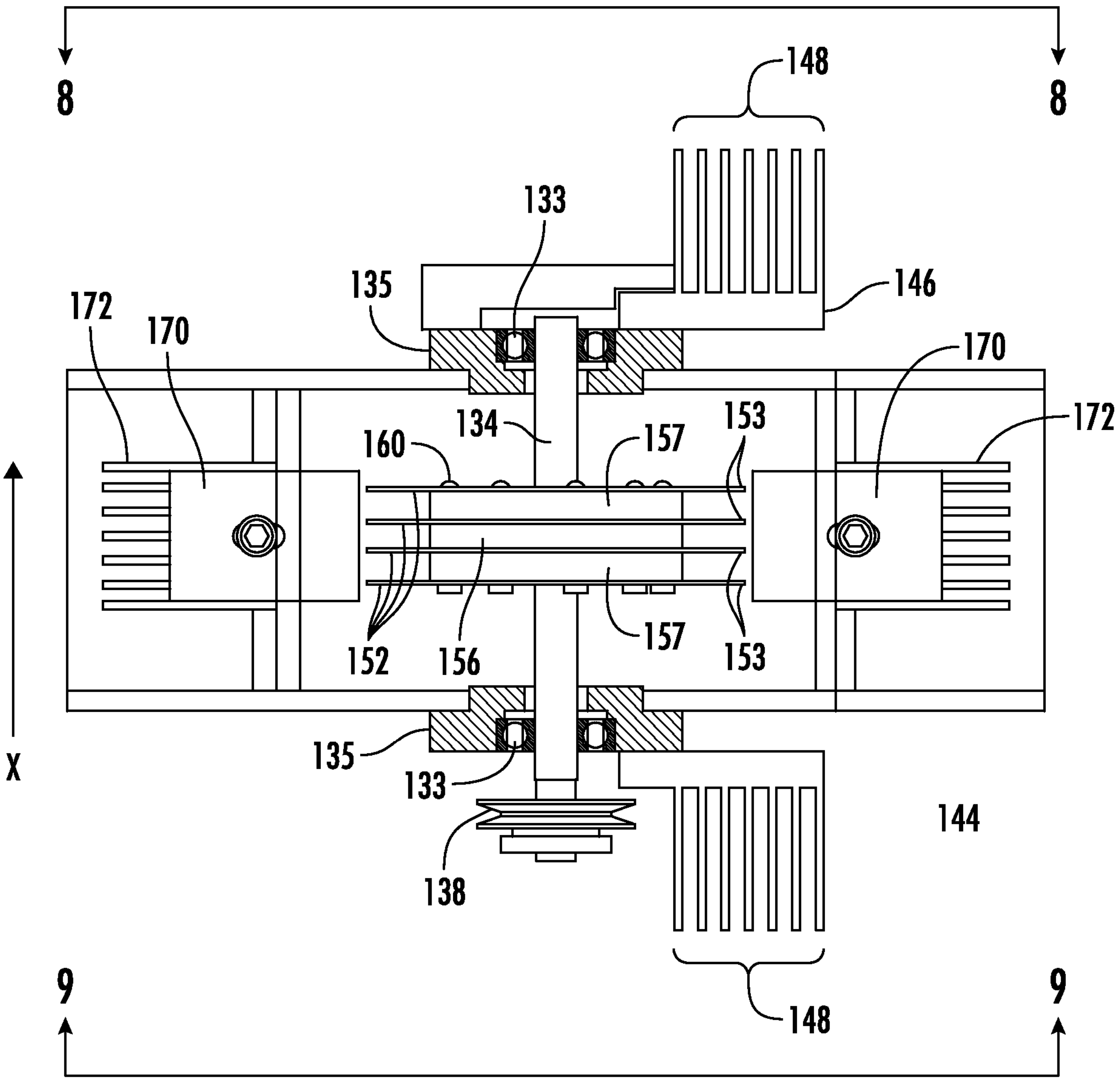
FIG. 10 is a plan view of the rotary spark gap of FIG. 7, taken from the top of the rotary spark gap with portions of the housing removed for purposes of clarity.

FIGS. 8-10 show the rotary spark gap 120 in greater detail. The rotary spark gap 120 includes a housing 140 that defines an interior compartment 142 configured for containing the components of the rotary spark gap 140. In particular, the interior compartment 142 of the housing 140 contains the plurality of rotors 152 and the plurality of insulating spacers 154 mounted on the rotatable rotor shaft 134, the bar electrodes 170 that electrically couple with the plurality of rotor points 153 provided on the rotors 152, and the heat sinks 172 in heat conducting relation with the bar electrodes 170. In an exemplary embodiment shown and described herein, the housing 140 has a removable cover 143 that forms an enclosure for the components of the rotary spark gap 120. The enclosure of the housing 140 reduces the noise produced by the rotary spark gap 120, reduces ozone production and reduces corrosion build-up on the rotors 152 and the bar electrodes 170 of the rotary spark gap 120. The housing 140 may be made of any suitable insulating material, such as high-temperature resistant polymer material. The housing 140 makes the rotary spark gap 120 a self-contained modular unit that can be readily removed from the Tesla coil 100 to accommodate maintenance, repair and/or replacement of the components of the rotary spark gap 120.

As previously described with respect to rotary spark gap 20, the rotor shaft 134 may be belt-driven by means of a belt (not shown) on a rotor shaft pulley 138 affixed to the rotor shaft 134 driven by an electric motor (not shown). In addition, the rotor shaft 134 may be mounted on high-speed bearings 133 adjacent each end of the rotor shaft 134 that are disposed within insulating and/or dampening isolators 135. As previously described, the opposite ends of the rotor shaft 134 are provided with a heat sink 144, 146 made of a suitable heat-conducting material, such as aluminum (Al) metal material, and having a plurality of heat-radiating fins 148 formed thereon for conducting heat generated by the rotatable rotor shaft 134 to the ambient environment in a conventional manner.

A rotor assembly 150 consists of the rotor shaft 134 with the rotors 152 and the insulating spacers 154 mounted on the rotor shaft 134. As previously described, each rotor 152 has a plurality of rotor points 153 on the periphery and spaced apart around the outer circumference of the rotor 152 in a circumferential direction R. As shown herein, four (4) rotors 152 are spaced apart and separated by a pair of annular outer spacers 155 and a center spacer 157 on the rotor shaft 134 in an axial direction X. The center spacer 157 is affixed to the rotor shaft 134 with the rotors 152 and the insulating spacers 154 secured together by a plurality of fasteners 160. Each rotor 152 has nine (9) rotor points 153 on the periphery spaced apart in the circumferential direction by about forty degrees (40°) and the rotors 152 are oriented out of phase with one another by about ten degrees (10°) so that the rotors 152 present as a thirty-six (36) point wheel when viewed from an end. The rotor points 153 on the rotors 152 electrically couple with a pair of bar electrodes 170 that span the rotors 152 on opposite sides of the rotor assembly 150 within the interior compartment 142 of the housing 140. Each bar electrode 170 is in heat-conducting relation with a corresponding thermally-conductive heat sink 172 operable for dissipating heat from the plasma generated by arcing between the rotor points 153 on the rotors 152 and the bar electrode 170.

Regardless of the foregoing description of exemplary embodiments of the invention, the optimum configuration of the article of manufacture, apparatus, device or system, and the manner of use, operation and steps of the associated methods, as well as reasonable equivalents thereof, are deemed to be readily apparent and understood by those skilled in the art. Accordingly, equivalent relationships to those shown in the accompanying drawing figures and described in this written description are intended to be encompassed by the invention given the broadest reasonable interpretation and construction of the appended claims, the foregoing written description and the accompanying drawing figures being considered as merely illustrative of the general concepts and principles of the invention. Furthermore, as numerous modifications and changes will readily occur to those skilled in the art, the invention is not intended to be limited to the specific configuration, construction, materials, manner of use and operation of the embodiments shown and described herein. Instead, all reasonably predictable and suitable equivalents and obvious modifications to the invention should be construed as falling within the scope of the invention as defined by the appended claims given their broadest reasonable interpretation and construction to one of ordinary skill in the art at the time of the invention in light of the foregoing written description and accompanying drawing figures.

That which is claimed is:

1. A rotary spark gap, comprising:

at least one rotor having a plurality of rotor points disposed on the rotor;

a rotatable rotor shaft operable for rotating the at least one rotor;

at least one electrode operable for electrically coupling with the rotor points; and at least one first thermally-conductive heat sink in heat conducting relation with the at least one electrode.

2. The rotary spark gap according to claim 1, further comprising at least one insulating spacer and wherein the at least one rotor and the at least one insulating spacer are mounted on the rotor shaft.

3. The rotary spark gap according to claim 1, further comprising at least one second thermally-conductive heat sink in heat conducting relation with the rotor shaft.

4. The rotary spark gap according to claim 1, further comprising a belt drive having a drive motor and a belt operable for rotating the rotor shaft.

5. The rotary spark gap according to claim 4, wherein the rotor shaft has a rotor shaft pulley, the drive motor has a drive motor pulley, and the belt extends between the drive motor pulley and the rotor shaft pulley.

6. The rotary spark gap according to claim 1, wherein the at least one rotor comprises a copper (Cu) metal material and the at least one electrode comprises a copper (Cu) metal material.

7. The rotary spark gap according to claim 3, wherein at least one of the first thermally-conductive heat sink and the second thermally-conductive heat sink comprises an aluminum (Al) metal material.

8. The rotary spark gap according to claim 1, further comprising at least one insulating spacer, wherein the at least one rotor comprises two or more rotors each having the plurality of rotor points disposed on a periphery of the rotor, wherein the at least one insulating spacer and the rotors are mounted on the rotor shaft, and wherein the rotors are spaced apart in an axial direction and separated by the at least one insulating spacer.

9. The rotary spark gap according to claim 8, wherein the at least one electrode spans the rotors in the axial direction.

10. The rotary spark gap according to claim 8, wherein the rotors are spaced apart in a circumferential direction relative to one another.

11. A rotary spark gap for a Tesla coil, the rotary spark gap comprising:

a rotatable rotor shaft;

a plurality of rotors, each rotor having a plurality of rotor points disposed on a periphery of the rotor;

at least one insulating spacer; and at least one electrode operable for electrically coupling with the plurality of rotor points on the plurality of rotors;

wherein the plurality of rotors and the at least one insulating spacer are mounted on the rotor shaft with the plurality of rotors spaced apart and separated by the at least one insulating spacer in an axial direction; and wherein the at least one electrode spans the plurality of rotors in the axial direction.

12. The rotary spark gap according to claim 11, wherein the plurality of rotors is spaced apart in a circumferential direction relative to one another, and wherein the plurality of rotor points disposed on the periphery of each rotor are spaced apart in the circumferential direction.

13. The rotary spark gap according to claim 11, further comprising at least one first thermally-conductive heat sink in heat conducting relation with the at least one electrode.

14. The rotary spark gap according to claim 13, further comprising at least one second thermally-conductive heat sink in heat conducting relation with the rotor shaft.

15. The rotary spark gap according to claim 14, wherein each of the plurality of rotors and the at least one electrode comprises a copper (Cu) metal material, and wherein the at least one first thermally-conductive heat sink and the at least one second thermally-conductive heat sink comprises an aluminum (Al) metal material.

16. The rotary spark gap according to claim 11, further comprising a belt drive having a rotor shaft drive motor and a belt operable for rotating the rotor shaft, and wherein the belt extends between a drive motor pulley affixed to the drive motor and a rotor shaft pulley affixed to the rotor shaft such that the rotor shaft is belt-driven by the belt drive.

17. A high-speed, high-voltage switch comprising:

a plurality of rotors each having a plurality of rotor points disposed on a periphery of the rotor;

a rotatable rotor shaft operable for rotating the plurality of rotors;

at least one electrode operable for electrically coupling with the plurality of rotor points on the plurality of rotors;

wherein the plurality of rotors is spaced apart in an axial direction on the rotor shaft and are spaced apart in a circumferential direction relative to one another;

wherein the plurality of rotor points on each of the plurality of rotors is spaced apart in the circumferential direction; and wherein the at least one electrode spans the plurality of rotors in the axial direction.

18. The high-speed, high-voltage switch according to claim 17, further comprising at least one insulating spacer, wherein the at least one insulating spacer is mounted on the rotor shaft with the plurality of rotors, and wherein the plurality of rotors is separated by the at least one insulating spacer on the rotor shaft in the axial direction.

19. The high-speed, high voltage switch according to claim 17, further comprising at least one first thermally-conductive heat sink in heat conducting relation with the at least one electrode.

20. The high-speed, high-voltage switch according to claim 19, further comprising, at least one second thermally-conductive heat sink in heat conducting relation with the rotor shaft.

* * * * *